United States Patent [19]

Thiel et al.

[11] 4,452,547

[45] Jun. 5, 1984

[54] MEANS DETACHABLY MOUNTING A SPEED REDUCING MECHANISM ON A SHAFT TO BE DRIVEN

[75] Inventors: Albert E. Thiel, Aberdeen; David E. Suica, Lebanon, both of Ohio

[73] Assignee: Emerson Electric Co., St. Louis, Mo.

[21] Appl. No.: 427,653

[22] Filed: Sep. 29, 1982

[51] Int. Cl.³ ............................................. B25G 3/20
[52] U.S. Cl. .................................. 403/370; 403/374; 74/421 R
[58] Field of Search ............... 403/368, 369, 370, 371, 403/374; 74/421 R

[56] References Cited

U.S. PATENT DOCUMENTS

| | | | |
|---|---|---|---|
| 2,452,458 | 10/1942 | Hahn | 403/356 X |
| 2,676,849 | 4/1954 | Houck et al. | 403/370 X |
| 2,986,416 | 5/1961 | Firth | 403/357 |
| 3,501,183 | 3/1970 | Stratienko | 403/370 |
| 3,590,652 | 7/1971 | Strang | 403/370 X |
| 3,893,779 | 7/1975 | Schroeter | 403/356 X |
| 3,900,270 | 8/1975 | Rhodes | 403/370 X |
| 4,053,244 | 10/1977 | Dively | 403/370 X |
| 4,304,502 | 12/1981 | Stratienko | 403/370 X |
| 4,357,858 | 11/1982 | Wedman | 285/305 X |

Primary Examiner—Dave W. Arola
Attorney, Agent, or Firm—Charles E. Markham

[57] ABSTRACT

A speed reducer having a power takeoff sleeve loosely receives therein a shaft to be driven. Concentricity and a driving connection of the shaft and sleeve is effected by a pair of telescoping bushings having tapered interfitting surfaces in each end of the sleeve. The inner bushing of each pair is split and grips the shaft when drawn into the outer bushing by screw threaded means. The outer bushings are concentric with and rotatable in the sleeve ends and keyed therein to preclude axial movement. In a first modification the inner split bushings are keyed to both shaft and sleeve and in a second modification the shaft is keyed directly to the sleeve.

1 Claim, 11 Drawing Figures

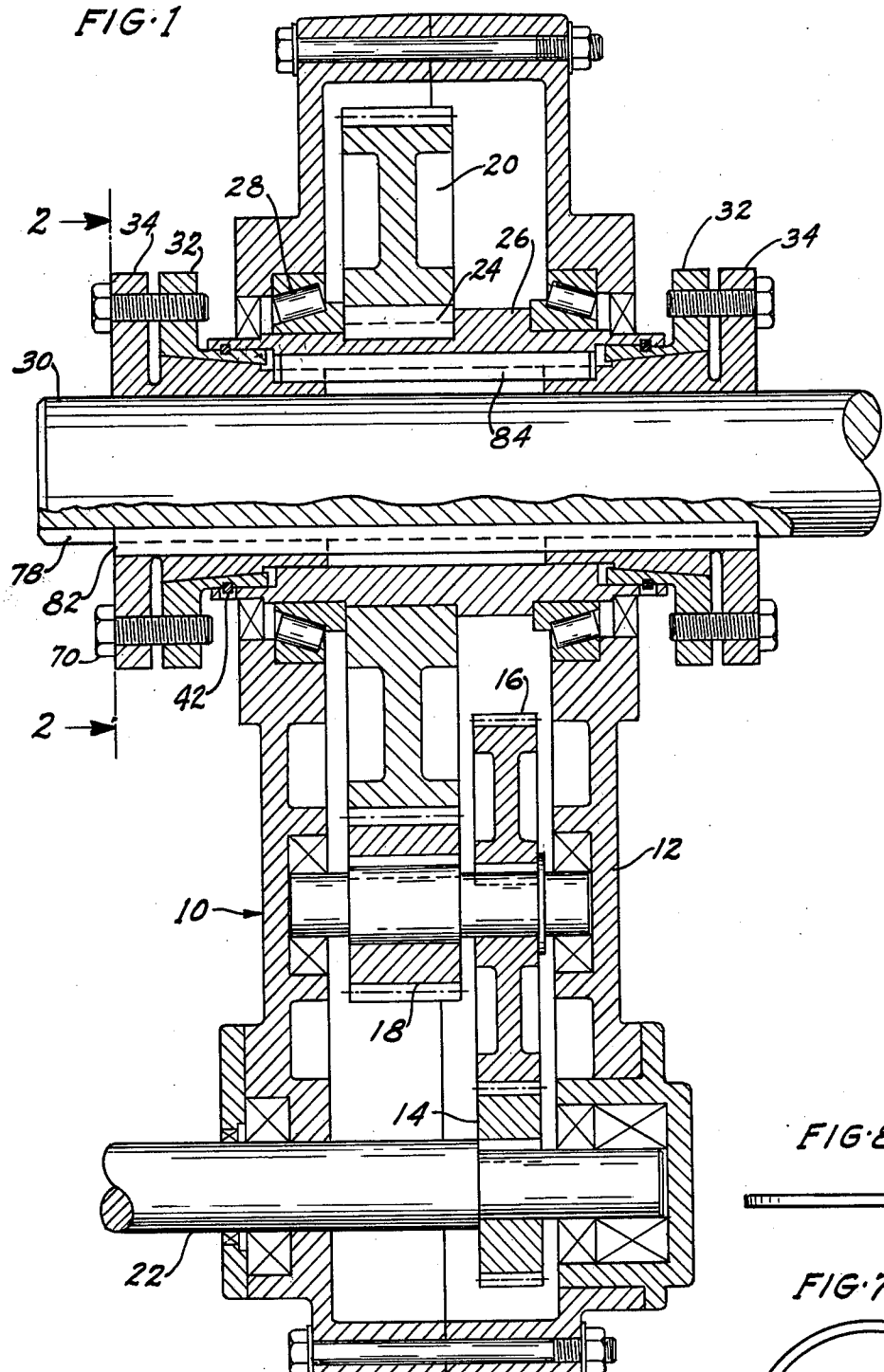
FIG. 1
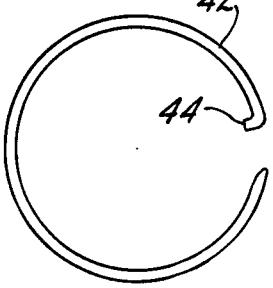

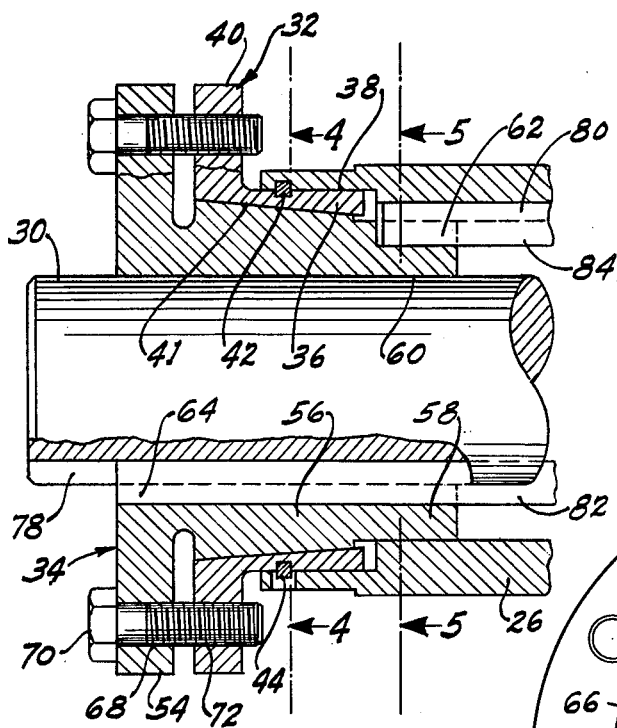
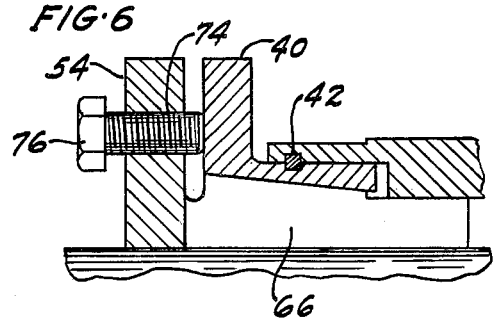
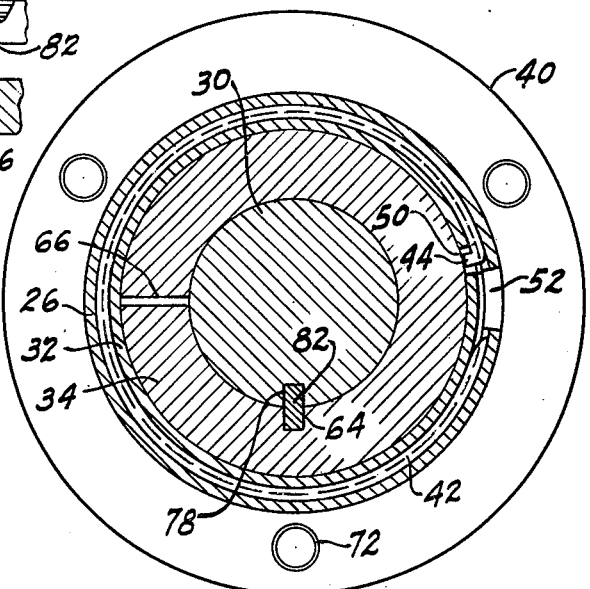
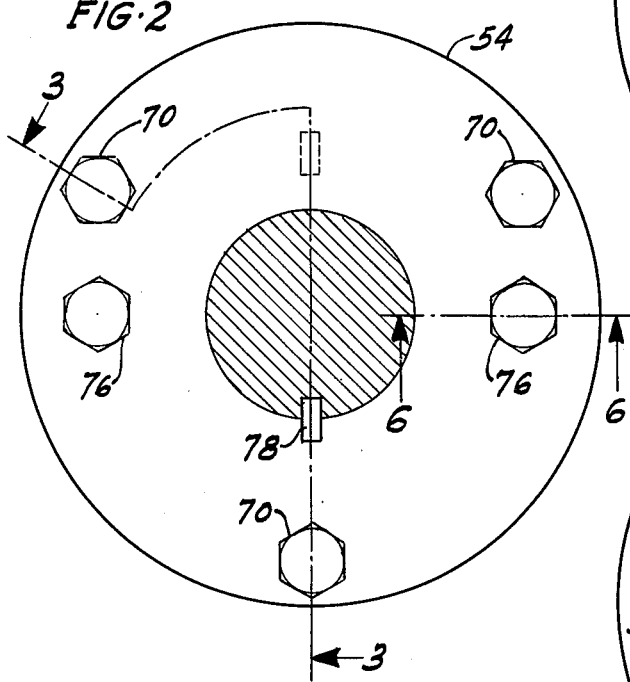
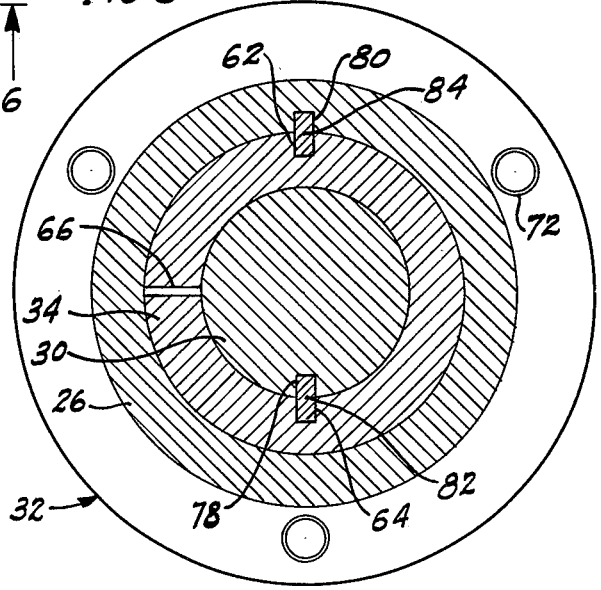

MEANS DETACHABLY MOUNTING A SPEED REDUCING MECHANISM ON A SHAFT TO BE DRIVEN

This invention relates to means for the convenient and concentric detachable mounting and drive coupling of a speed reducing mechanism on a shaft to be driven thereby.

BACKGROUND OF THE INVENTION

It is customary to provide speed reducing mechanisms with hollow power takeoff shafts or sleeves so that they may interchangeably receive therein the shafts of mechanisms to be driven thereby. Since clearance is required between the driven shaft and the power takeoff sleeve in order to provide for the convenient detachable mounting of the speed reducer on the driven shaft some means for establishing and maintaining the precise concentricity of the power takeoff sleeve and driven shaft therein is required in order to prevent any wobble.

In some prior arrangements for establishing concentricity between these members exteriorly tapered and longitudinally split bushings were inserted into the similarly internally tapered ends of the power takeoff sleeve. These bushings normally loosely fitted the shaft to be driven and were drawn into the tapered ends of the sleeve by screw threaded means so as to contract and grip the driven shaft. This resulted in substantial frictional engagement of the bushings with both the driven shaft and power takeoff sleeve. In some prior arrangements of this kind the driving connection between the power takeoff sleeve and driven shaft depended upon this friction between the contracted bore of the bushings and driven shaft and between the exteriorly tapered surfaces of the bushings and interiorly tapered surfaces at the ends of the power takeoff sleeve. In other arrangements of this kind feather keys were employed keying the sleeve to the driven shaft in addition to the frictional engagement of the split bushings with the sleeve and driven shaft.

Because of the considerable torque which is frequently transmitted between the sleeve and driven shaft it has been found desirable to avoid transmitting any torque through the frictionally engaged surfaces which function to establish precise concentricity lest this concentricity be disturbed thereby and to transmit all torque positively and completely independently of these frictionally engaged surfaces through suitable keys. Moreover, it was found desirable to reduce the required contraction of the tapered split bushings functioning to effect concentricity to a minimum so as to minimize their deviation from a perfect circle when contracted. This may be accomplished by sizing the inside diameters of the bushings close to yet accommodating established industry standards for diametral tolerances of cold rolled shafting so as to permit the convenient slidable mounting of the bushings on the driven shaft. Accordingly we have provided improved means for the convenient detachable and precise concentric mounting and drive coupling of a speed reducer having a power takeoff sleeve on a shaft to be driven thereby which incorporates the above desirable features.

OBJECTS OF THE INVENTION

An object of the invention is to provide generally new and improved means for the convenient detachable mounting and drive coupling of a speed reducing mechanism having a hollow power takeoff sleeve on a shaft to be driven thereby, which means is particularly rugged and reliable and in which precise concentricity of the sleeve and driven shaft is maintained under conditions of high torque transmission.

A further object is to provide tapered bushing means free to rotate in the ends of the sleeve for effecting and maintaining the concentricity of the sleeve and driven shaft therein and for precluding relative axial movement of these members and key means providing a driving connection between these members.

Other objects and advantages will become apparent when reading the following descriptions of embodiments of the invention in connection with the accompanying drawings.

THE DRAWINGS

FIG. 1, is a longitudinal cross-sectional view of a speed reducer having a power takeoff sleeve loosely receiving a shaft to be driven thereby and incorporating telescoping tapered bushing means for effecting concentricity and keying means for effecting a driving connection as constructed and arranged in accordance with a first embodiment of the present invention;

FIG. 2, is an enlarged end elevational view of the shaft and inner bushing flange taken along line 2—2 of FIG. 1;

FIG. 3, is an enlarged fragmentary longitudinal cross-sectional view of one end of the sleeve and driven shaft and is taken along line 3—3 of FIG. 2;

FIG. 4, is a transverse cross-sectional view taken along line 4—4 of FIG. 3;

FIG. 5, is a transverse cross-sectional view taken along line 5—5 of FIG. 3;

FIG. 6, is a fragmentary cross-sectional view taken along line 6—6 of FIG. 2;

FIGS. 7 and 8, are plan and edge elevational views of the bushing retaining ring shown alone;

DESCRIPTION OF A FIRST EMBODIMENT OF THE INVENTION

Figure 9:
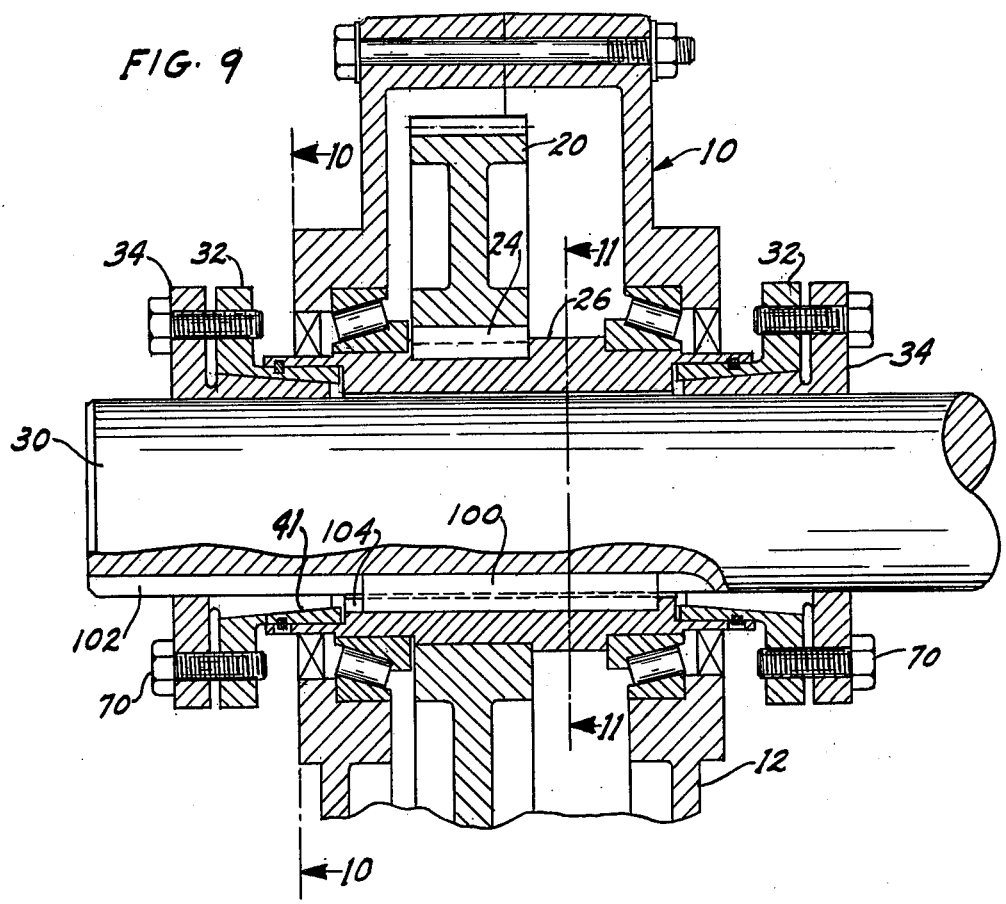
FIG. 9, is a fragmentary longitudinal cross-sectional view of the speed reducer incorporating a second embodiment of the invention.

Referring to FIGS. 1 to 8 a speed reducer is generally indicated at 10 and comprises a split casing 12 enclosing a speed reducing gear train comprising meshing gears 14, 16, 18 and 20. The gear train is driven through a drive shaft 22 which is usually driven by an electric motor (not shown). The final large gear 20 is keyed by a key 24 to a power takeoff sleeve 26. The sleeve 26 extends through casing 12 and is journalled in the casing and provided with suitable anti-friction bearings 28. The end portion of a shaft 30 to be driven by the speed reducer extends through sleeve 26. Shaft 30 is smaller in diameter than the inside diameter of sleeve 26 and is held precisely concentric therein by a flanged outer bushing 32 and an interfitting flanged inner bushing 34 inserted in each end of sleeve 26.

Referring to FIG. 3, outer bushings 32 each have a hollow cylindrical portion 36 which is slip fitted into a counterbore 38 at each end of sleeve 26 and a circular flange 40 at one end of cylindrical portion 36. Outer bushings 32 also have a tapered bore 41 therethrough concentric with the outside diameter of its cylindrical portion 36 which tapered bore diminishes in diameter axially from the flanged end thereof. Outer bushings 32 are rotatable in counterbores 38 and are keyed therein against axial movement by retainer rings 42 entered into circular key ways in the exterior surface of the cylindrical portions 36 of outer bushings 32 and in the walls of counterbores 38 at the ends of the sleeves 26.

Referring to FIGS. 4 and 7, the retainer rings 42 are split and have one hooked end 44 provided by forming a short portion of that end radially inward. The retainer rings 42 are somewhat flexible by reason of their cross-sectional dimensions and are conveniently entered into the circular keyways in outer bushings 32 and the ends of sleeve 26 by first rotating the bushings 32 so that apertures 50 provided in the walls of the bushings 32, see FIG. 4, are aligned with access apertures 52 provided in the walls of the sleeve 26, see FIG. 4. Next the hooked ends 44 of the rings 42 are inserted through the apertures 52 and into the apertures 50 in bushings 32 and bushings 32 are then rotated clockwise in FIG. 4 causing the rings 42 to be pulled into the circular keyways in the bushings 32 and sleeve 26. The hook receiving apertures 50 in bushings 32 and the access apertures 52 in counterbores 38 of the sleeves are axially aligned with their respective circular keyways and the axial alignment of the circular keyways in the bushings and sleeve is determined by viewing through access apertures 52.

The inner bushings 34 each have a circular flange 54 at one end, an externally tapered portion 56 extending axially from the flange and diminishing in diameter from the flange, a reduced diameter cylindrical portion 58 extending axially from the small end of tapered portion 56 and a straight bore 60 extending therethrough concentric with exterior surfaces of portions 56 and 58. The cylindrical portions 58 of bushings 34 freely enter the sleeve 26 and have a keyway 62 extending longitudinally in the exterior surface thereof. Also the bore 60 has a longitudinal keyway 64 in the wall thereof extending completely through the bushing and being diametrically opposed to the keyway 62.

The tapered portions 56 and cylindrical portions 58 of the bushings 34 are longitudinally split as indicated at 66 in FIGS. 4, 5 and 6, at 90° from a centerline passing through the keyways 62 and 64. The bore 41 in outer bushing 32 and the interfitting exterior surface of portion 56 of inner bushings 34 are tapered so as to cause contraction of the split portions of bushings 34 as they are formed into tapered bores 41. The flanges 54 of inner bushings 34 are provided with circularly spaced clearance holes 68 to receive cap screws 70 and the flanges 40 of outer bushings 32 have similaly circularly spaced tapped holes 72, for the screw threaded engagement of the cap screws 70. The flanges 54 of inner bushings 34 are also provided with two or more tapped holes 74, see FIGS. 2 and 6, for the screw threaded engagement of cap screws 76 which bear against the flanges 40 of outer bushings 32 when tightened so as to disengage the inner bushing 34 from outer bushing 32. A keyway 78 in the shaft 30 and matching keyways 64 in bore 60 of inner bushings 34 receive a key 82 and keyway 80 in the sleeve 26 and matching keyways 62 in the external surfaces of portions 58 of bushings 34 receive a key 84 to provide a positive drive connection of the shaft 30 and sleeve 26.

When preparing to mount the speed reducer 10 on the shaft 30 in the arrangement shown in FIGS. 1 to 9 the key 84 is first inserted into the keyway 80 in sleeve 26, next the outer bushings 32 are inserted into the counterbores 38 and the retaining rings 42 inserted in the manner heretofore described. Following this, inner bushings 34 are inserted into outer bushings 32 with their keyways 62 aligned with keyways 80 to receive end portions of key 84. Rotation of outer bushings 32 will align clearance holes 68 in the flanges 54 of bushings 34 with tapped holes 72 in flanges 40 of bushings 32 so that cap screws 70 may be inserted and threadedly engaged but not tightened.

Key 82 is then inserted into keyway 78 in shaft 30 with the driven shaft 30 rotated to a position wherein the entire assembly may be pushed on shaft 30 with keyways 64 in bushings 34 receiving the key 82. Cap screws 70 are then tightened establishing the concentricity of sleeve 26 and driven shaft 30 and causing split portions 56 and 58 of bushings 34 to contract and grip shaft 30 sufficiently to preclude relative axial motion of the speed reducer 10 and driven shaft 30. When removing the speed reducer 10 from shaft 30 the screws 70 are backed off and the screws 76 tightened to disengage the inner bushing 34 from outer bushing 32. The speed reducer may then be pulled off of shaft 30.

DESCRIPTION OF A SECOND EMBODIMENT OF THE INVENTION

Figure 11:
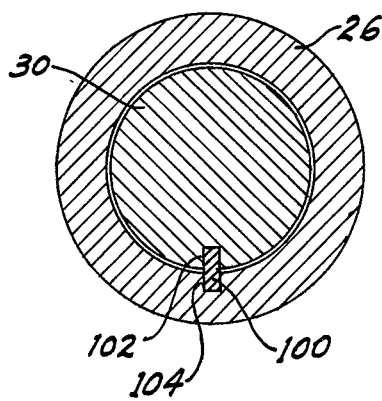
FIG. 11, is a transverse cross-sectional view taken along line 11—11 of FIG. 9.
Figure 10:
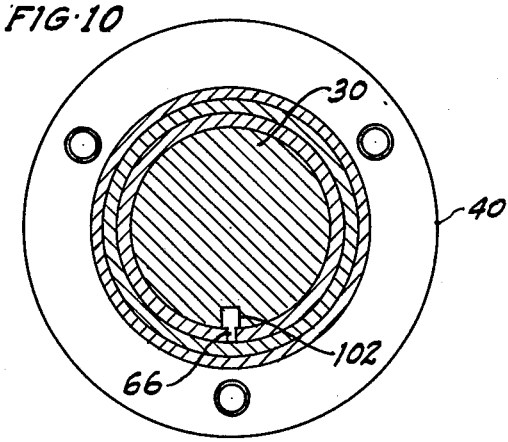
FIG. 10, is a transverse cross-sectional view taken along line 10—10 of FIG. 9.

Referring to the arrangement shown in FIGS. 9 to 11 in which like elements and parts are designated by like numerals. In this arrangement the power takeoff sleeve 26 of speed reducer 10 is directly keyed to the driven shaft 30 by a single key 100 inserted into a keyway 102 in shaft 30 and a matching keyway 104 in the sleeve 26. Also the inside diameter of sleeve 26 may be made closer to the diameter of the driven shaft 30. In mounting the speed reducer 10 on shaft 30 in this arrangement an outer bushing 32 and an inner bushing 34 are first assembled in the right hand end of sleeve 26 in FIG. 9. The speed reducer sleeve 26 is then slid onto shaft 30 and key 100 inserted into keyways 102 and 104 in the shaft 30 and sleeve 26 respectively after which the outer bushing 32 and inner bushing 34 are assembled in the left end of sleeve 26. It will be understood that in this arrangement the diameter of the small end of the tapered bores 41 in the outer bushings 32 may be made large enough to clear the radial depth of keyway 104 in sleeve 26 in which case the outer bushing 32 may also be assembled in the left end sleeve 26 prior to sliding the speed reducer on shaft 30.

We claim:

1. Means for the detachable, concentric mounting and drive coupling of the power takeoff sleeve of a speed reduction mechanism on a shaft to be driven thereby and loosely inserted through the sleeve comprising; a pair of telescoping bushings inserted into each end of said sleeve, the outer bushing of each pair having a continuous outer cylindrical wall surface and being slip-fitted and rotatable in the ends of said sleeve and being keyed therein against axial movement by split retaining rings inserted into circular keyways in the interior and exterior wall surfaces of said sleeve and outer bushings respectively through apertures in the wall of said sleeve, the inner bushing of each pair being longitudinally split and loosely fitting said shaft, the meeting surfaces of said pairs of bushings being tapered to cause said inner bushings to contract and grip said shaft when drawn into said outer bushings, screw threaded means for drawing said inner bushing into said outer bushings and screw threaded means for withdrawing said inner bushings from said outer bushings, and means keying said shaft to said sleeve to provide a positive driving connection.

* * * * *